United States Patent
Frieden

(10) Patent No.: US 9,463,835 B2
(45) Date of Patent: Oct. 11, 2016

(54) BICYCLE DYNAMO

(71) Applicant: Peter Frieden, Cologne (DE)

(72) Inventor: Peter Frieden, Cologne (DE)

(73) Assignee: VELOGICAL ENGINEERING GMBH, Cologne (DE)

(*) Notice: Subject to any disclaimer, the term of this patent is extended or adjusted under 35 U.S.C. 154(b) by 0 days.

(21) Appl. No.: 14/375,565

(22) PCT Filed: Feb. 28, 2013

(86) PCT No.: PCT/EP2013/000575
§ 371 (c)(1),
(2) Date: Nov. 3, 2014

(87) PCT Pub. No.: WO2013/127525
PCT Pub. Date: Sep. 6, 2013

(65) Prior Publication Data
US 2015/0062939 A1    Mar. 5, 2015

(30) Foreign Application Priority Data

Feb. 28, 2012  (DE) .......... 10 2012 003 944

(51) Int. Cl.
*B62J 6/12* (2006.01)
*B62J 6/06* (2006.01)
*B62J 6/02* (2006.01)
*H02K 7/18* (2006.01)

(52) U.S. Cl.
CPC .. *B62J 6/12* (2013.01); *B62J 6/02* (2013.01); *B62J 6/06* (2013.01); *H02K 7/1846* (2013.01)

(58) Field of Classification Search
None
See application file for complete search history.

(56) References Cited

U.S. PATENT DOCUMENTS

| | | | | |
|---|---|---|---|---|
| 5,857,762 A | * | 1/1999 | Schwaller | B62J 6/06 310/156.57 |
| 5,932,943 A | | 8/1999 | Werner | |
| 2005/0280322 A1 | * | 12/2005 | Tsou | B62J 6/06 310/67 R |
| 2008/0304254 A1 | * | 12/2008 | Canino | F21L 4/04 362/183 |
| 2011/0011656 A1 | * | 1/2011 | Poulsen | B60K 6/26 180/65.25 |

FOREIGN PATENT DOCUMENTS

| | | | |
|---|---|---|---|
| DE | 4133723 A | | 4/1993 |
| DE | 4317817 B | | 6/1994 |
| DE | 9400018 U | | 10/1994 |
| DE | 29614301 U | | 11/1996 |
| EP | 2150093 A2 | * | 2/2010 |
| FR | 1041545 B | | 10/1953 |
| GB | 441403 B | | 1/1936 |
| JP | 63013390 B | | 1/1988 |

\* cited by examiner

*Primary Examiner* — Sharon Payne
(74) *Attorney, Agent, or Firm* — Andrew Wilford

(57) ABSTRACT

A bicycle dynamo for a bicycle having a frame and a wheel has a stator, an internal stationary winding fixed on the stator, and an external rotor rotatable on the stator. This rotor has a rotatable cylindrical external casing surrounding the winding and formed with an outwardly open annular groove, a plurality of permanent magnets inside the casing that generate an electrical voltage in the internal stationary stator winding, and an elastic ring frictionally engageable with a rim of the bicycle wheel, set in the annular groove, and projecting from the outer casing. A holder carries the stator.

8 Claims, 3 Drawing Sheets

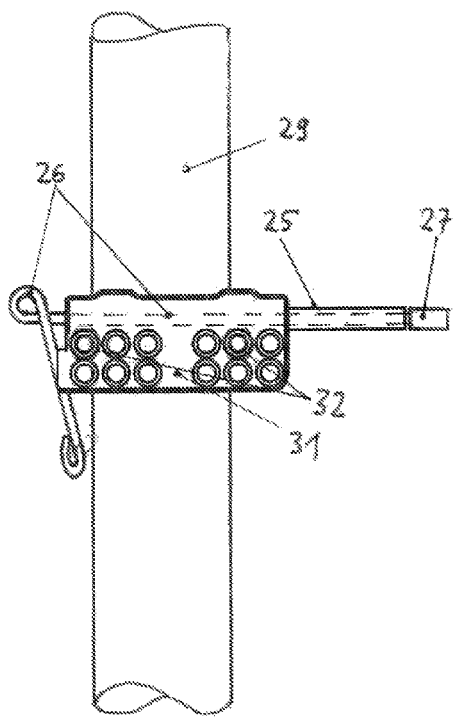 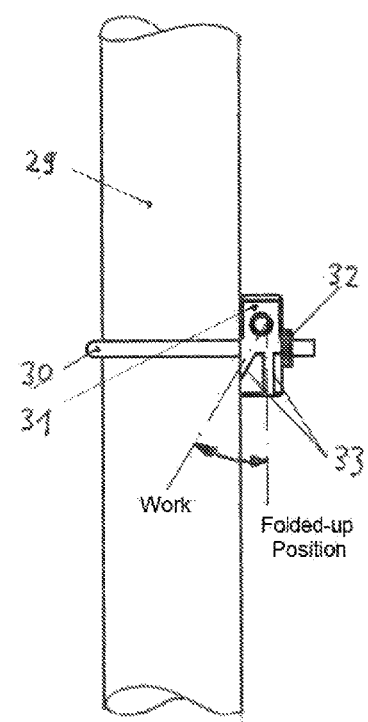
Fig. 5  Fig. 6

BICYCLE DYNAMO

CROSS REFERENCE TO RELATED APPLICATIONS

This application is the US-national stage of PCT application PCT/EP2013/000575 filed 28 Feb. 2013 and claiming the priority of German patent application 102012003944.1 itself filed 28 Feb. 2012.

FIELD OF THE INVENTION

The invention relates to a bicycle dynamo with an external rotor that carries a plurality of permanent magnets on its inner periphery, which generate an electrical voltage in the internal stationary stator winding.

BACKGROUND OF THE INVENTION

The familiar side-mounted dynamo is the most widespread type for bicycles and, in terms of its mechanical and electrical structure, has been developed especially for operating incandescent bulbs. As their luminous efficiency falls dramatically when the voltage decreases and their filaments quickly burn out in the presence of excess voltage, in the middle of the last century performance characteristics were specified in the German Road Traffic Licensing Regulation (StVZO), which facilitate the direct connection of incandescent bulbs, but adherence to this specification comes at a high price:
- the dynamo has an extremely high mechanical transmission ratio (i.e. high revs in relation to the traveling speed) so that it can generate sufficient output even at low speeds. At high speeds it is very loud.
- intentionally high eddy current losses have been designed into the magnetic circuit in order to throttle the output voltage with increasing speed. The very low efficiency of the system not only requires a large design volume and weight but also a very high mechanical propulsive power with a correspondingly high braking effect.
- Even high compressive force on the tire and the ribbing in the flank of the tire are barely sufficient to transfer the high peripheral force. Low levels of soiling or wet conditions are sufficient to cause the dynamo to slip.

In order to guarantee reliable function in poor weather conditions, a change took place a number of years ago toward equipping bicycles for everyday use with hub dynamos as a standard feature. Admittedly, it is possible with modern magnetic materials of high flux density to keep the design volume and weight within tolerable limits, but, with a weight-to-power ratio of 400 g/W=133 kg/kW, the hub dynamo, is far below all technological standards. This is not so much due to the engineering design itself, but more to the principle that the output of all electrical machines rises or falls with rotational speed. The supposed advantages of the hub dynamo are at the same time its disadvantages: It is built into the spokes of the front wheel and can therefore only be retrofitted with great effort and often not all. It rotates only at the frequency of the wheel and hence far too slowly for an electrical machine. Consequently, it is heavy, too expensive and, above all, rotates permanently, generating additional friction, even when not required.

In the sport of cycling, the above-mentioned reasons mean that the hub dynamo has barely become established. Instead, the dominant system—if any—in this field has been removable, battery-powered lighting. Apart from their still relatively high weight, the batteries are a burden on the environment.

A solution similar to the approach in this invention is described in DE 195 45 680 [U.S. Pat. No. 5,932,943]: as is usual in the field of electrical engineering, this involves a three-phase current machine with coated thin dynamo sheets to minimize eddy current losses. To allow the entire system to operate, there is a clear functional separation between electricity generation (with optimum efficiency) and low-loss electronic power control. As this dynamo is driven by a friction wheel on the tire and has strong permanent magnets on the rotor, minimization of the magnetic torque was necessary, i.e. a differing number of magnets and slots. The dynamo is designed as an internal rotor and if reasons of production technology mean that the magnets are merely cemented in place, it only has limited stability to rotational speed: it is able to self-destruct if the centrifugal forces tear the magnets out of their mountings. Another disadvantage is the unfavorable ratio of the radii between the air gap and the outer contour of the housing.

In order to facilitate a sufficiently high rotational speed or high transmission ratio, the diameter of the friction wheel should exceed that of the air gap by as small a margin as possible. Due to the eccentric mounting of the friction wheel axle, this aspect is in fact taken into account but at the cost of a design that is not only extremely complex but could also be very prone to failure in the long term due to the dry and fast-rotating gearing. As the circuit board with rectifier and electronic power/voltage control is located directly in the dynamo housing and is tailored to this dynamo, only the version with three-phase current makes sense here because it is the only way to achieve the highest possible efficiency.

In the future, the bicycle is set to assume a growing role in the ecological transformation of our traffic systems. It is therefore important to exploit all opportunities to make cycling more attractive, i.e. safer, faster, more comfortable and, if possible, even cheaper. Hitherto unexploited opportunities exist in the field of bicycle lighting and particularly in relation to the dynamo.

OBJECT OF THE INVENTION

The object of this invention consists in constructing a bicycle dynamo with a simple design that:
- should have a maximum efficiency in excess of 60%,
- should generate a tactile resistance or braking effect of less than 1 Newton at normal speed (equivalent to a gradient of approx. 1:900),
- should, at less than 60 g if possible, weigh approx. only one quarter as much as a side-mounted dynamo and only one eighth as much as a hub dynamo,
- does not slip even in rainy, wet and moderately snowy conditions,
- is able to work continuously with low noise and wear,
- is mechanically and electrically capable of coping with speeds of up to 100 km/h,
- can be folded away and adapted to any type of bicycle and special HPV designs by means of a flexible fastening system,
- requires for its manufacture only a minimum quantity of expensive raw materials (copper, rare earths, etc.), which permits reasonably priced mass production.

SUMMARY OF THE INVENTION

According to the invention, this object is attained by the cylindrical outer casing of the external rotor carrying an elastic ring to achieve a frictional contact with the rim of the bicycle wheel. Here it is of great advantage if the outer casing has a coaxial annular groove or forms such a groove with a rotor cap covering the outer casing in which the elastic ring, in particular an 0-ring, is seated and only projects slightly beyond the outer casing.

One important idea of this invention is that the exclusive use of LED lamps and a clear functional separation between electricity generation and control means that the overall efficiency of the lighting system (in particular that of the dynamo) can be improved to the extent that sufficient power for convenient and safe illumination is transferred with significantly lower transmission forces between bicycle wheel and dynamo. Although the flank of the rim has hitherto appeared unsuitable due to its smooth surface, the option then arises of no longer using the ribbing of the tire (that forms a type of interlocking connection with the dynamo wheel) for the transmission of power but, instead, the pure frictional contact on the flank of the rim.

The well-metered compressive force applied by the fastening system embodied in the invention is perfectly sufficient to achieve this. An advantage here is that, in contrast to the tire, the rim has practically no deviations in shape and consequently runs considerably more smoothly, accumulates practically no dirt (that acts as a lubricating film on the tire) and remains relatively dry even in rain and moderate snowfall. Due to the low contact surface, the 0-ring does not lift up because of aquaplaning effects even in pouring rain. A correctly installed rim dynamo embodying the invention has a turbine-like operation, generates a barely perceptible noise and does not move within its mounting unless the rim is buckled.

BRIEF DESCRIPTION OF THE DRAWING

Embodiments of the invention are shown in the drawings and are described in greater detail below. In the figures:

FIGS. 5 and 6 are two side views showing the dynamo mount according to the invention.

SPECIFIC DESCRIPTION OF THE INVENTION

Figure 1:
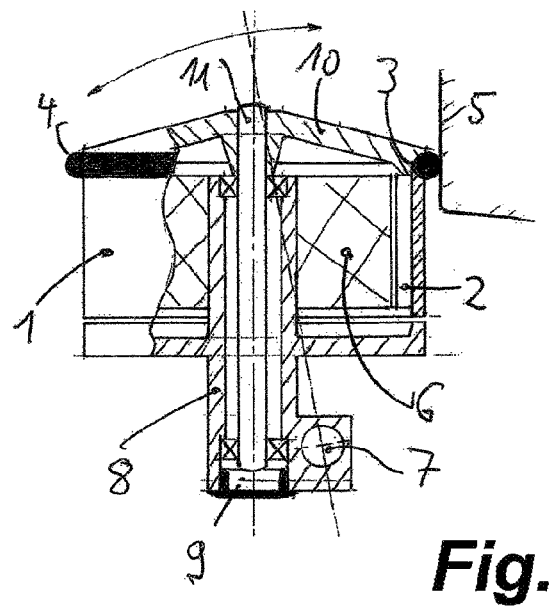
FIG. 1 is an axial longitudinal section through the bicycle dynamo.

The dynamo of the invention has a clear functional separation between electricity generation and electricity or power control and is designed as a multipolar external rotor generator. It consists (see FIG. 1) of a rotating magnetic feedback ring 1, on whose inner periphery is an even number of alternately poled neodymium high-power magnets 2 and that has a circumferential groove 3 on the outside, in which an 0-ring 4 is located. A torsion spring 26 acting on the dynamo holder 8 presses the rotating dome with the 0-ring against a wheel rim 5. To minimize the magnetic cogging torque, the stationary stator pack 6 has a number of slots/pole pieces that differs from the number of magnets 2. The winding designed for maximum alternating voltage consists of a continuous wire, which is wound onto the pole pieces in a cyclically alternating direction of rotation, with each third, fourth, fifth or six pole shank not being wound, according to the number of pole pieces.

Figure 2:
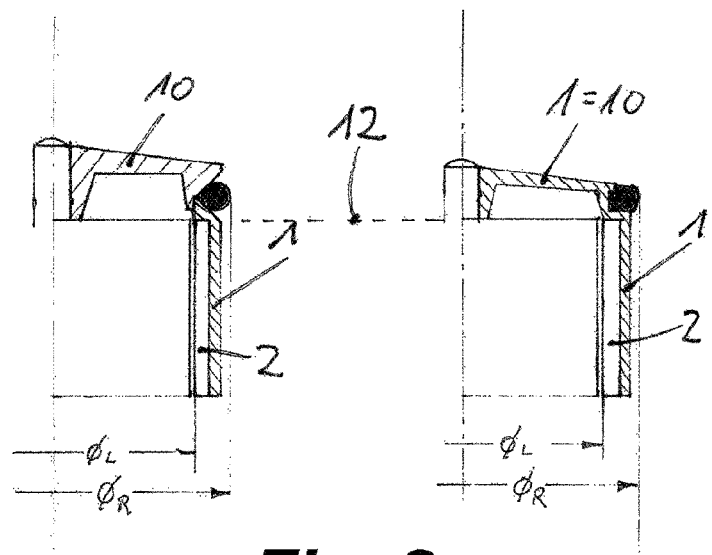
FIG. 2 is two axial partial sections through the external rotor in two different designs.

A flexible fastening system designed for the dynamo enables it to be retrofitted in various locations (fork or fork slider of suspension forks, frame struts, etc.) without any mechanical work being required on the frame. An adapter specially developed for mounting on the brake boss of rim brakes is extremely lightweight, stiff and straightforward to mount The construction of the dynamo can become all the more lightweight and compact as the diameter ratio of friction wheel to air gap decreases ($\phi_R/\phi_L$). In accordance with the invention, a large part of the ring cross-section is made to disappear inside the rotating part of the external rotor in order to minimize the roller diameter ($\phi_R$ in FIG. 2). This is only possible above the magnet plane 12. The position at which the split construction (FIG. 2 left) can be especially well realized lies in the area of the joint between aluminum rotor cap 10 and steel magnetic feedback ring 1. For mass production it may be more convenient to produce the rotor casing from one piece (FIG. 2 right) and replace the 0-ring 4 by a specially molded elastomer component. If absolutely necessary, the ratio of radiuses ($\phi_R/\phi_L$) can even be set to <1 by mounting a bottleneck that carries the 0-ring above the rotor casing—in a similar way to the classical side-mounted rotor.

In accordance with the invention, the number of slots in the stator must definitely differ from the number of magnets otherwise a considerable cogging torque is produced that can barely be overcome by friction. As the magnets are cemented into the magnetic feedback ring from inside alternately in north and south directions, they are always present in an even number (e.g. 6, 8, 10, 12, 14, etc.) while the number of slots (or pole pieces) in the stator pack may be even or uneven.

To permit a small and lightweight construction of the dynamo, it is fitted with modern high-power magnets (e.g. neodymium). An alternative is multipolar magnetized ferrite rings, as used for example in the mechanisms of CD-ROM drives. This cost benefit in mass production is counterbalanced by higher weight. Consequently, the ideal solution is multipolar magnetized neodymium rings.

The coils on the stator pack are arranged according to the magnetic flux in terms of position and direction of rotation (direction of windings) in order to generate a maximum voltage from the given size. If the dynamo is constructed as an single-phase A.C. generator, it is proposed that, according to the number of poles, every third, fourth, fifth or sixth pole shank not be wound. As soon as lighting units with three-phase current input are available, the dynamo will also be supplied in a three-phase current version with the usual winding arrangement in order to achieve efficiencies in excess of 90%.

Figure 3:
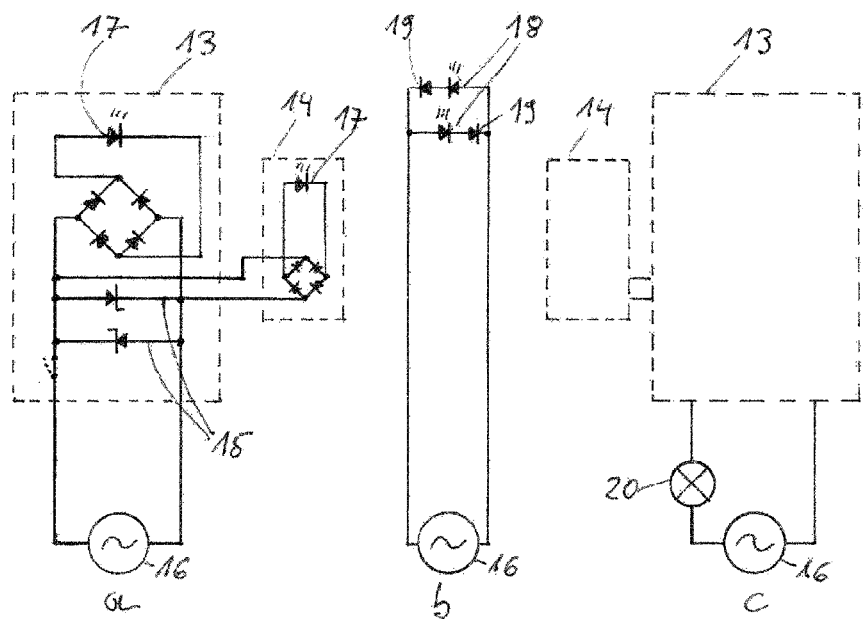
FIG. 3 is a circuit diagram for connecting the dynamo to a bicycle headlight.

The characteristic dynamo curve demanded in the StVZO is based on the premise that any dynamo must be capable of being combined with any headlight, i.e. incandescent and halogen bulbs must continue to be given consideration. However, aspects of efficiency, reliability and durability rule out these traditional lamps, and it is proposed that the electrical properties of the dynamo should be adapted exclusively to operation with modem LED headlights. The latter produce much more light with the same electricity consumption, have a voltage limitation integrated as standard and already produce more light under partial load, i.e. with an undervoltage, than incandescent bulbs at their optimum operating point. The dynamo of this invention should only be operated with suitable or tested LED lighting systems. The headlight (13 in FIG. 3a) requires sufficiently dimensioned overvoltage protection, to which the tail light 14 should also be connected. According to the customary procedure, two Zener diodes in parallel with opposite polarity are used that become conductive beyond a certain voltage level (i.e. at unusually high speed) and seemingly short-circuit the dynamo 16 and thus protect the LED 17 against overvoltage. Excess energy is thus converted into heat and dissipated via heat sinks. It is also advantageous if two greatly overdimensioned light-emitting diodes (18 in FIG. 3b) in parallel with opposite polarity are themselves used as "overvoltage protection". This has the benefit that not only the dynamo output increases with rising speed but also that the brightness continues to rise substantially, a thoroughly desirable effect. Due to the poor blocking action of LEDs, additional blocking diodes 19 are integrated here.

In order to prevent an excessive rise in current, the dynamo should have a current-limiting connection. In the most straightforward case it is sufficient to render the dynamo itself current-limiting by enlarging the air gap, which does, however, take place at the expense of its power density. Alternatively a PTC thermistor (20 in FIG. 3c) can be built into the circuit: At normal speed, it remains cold and conducts the electricity practically without loss. Only at high speed when the overvoltage protection (part of the LED headlight) causes the current to rise does the PTC thermistor heat up, increase its ohmic resistance many times and limit the current. Suitable PTC thermistors are 12V/20 W halogen bulbs, which are only subject to a minimum load in this application. Combining a soft dynamo with a PTC thermistor allows speeds of up to 100 km/h to be mastered, which allegedly occur on downhill runs by recumbent cycles with full fairing.

Figure 4:
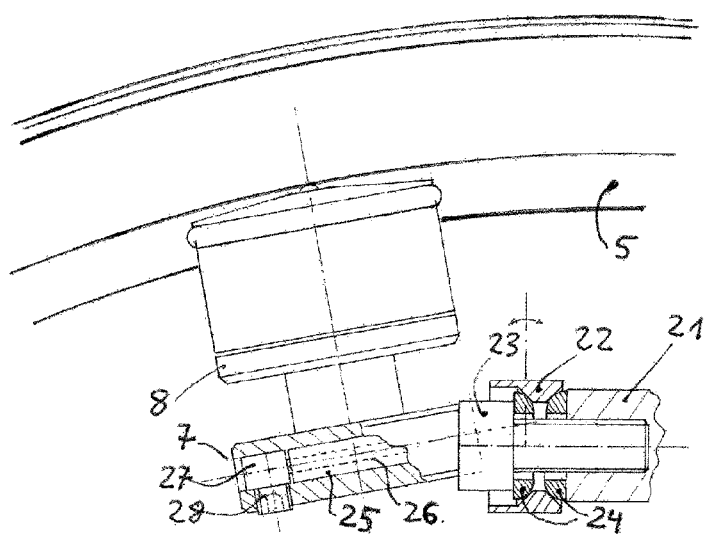
FIG. 4 is a side view of the dynamo with parts for mounting it to the bicycle partly in section.

The dynamo can be mounted in a particularly elegant manner directly onto the boss (21 in FIG. 4) of a rim brake. To do this, the pivot bolt of the brake is removed and replaced by a somewhat longer bolt 23 inserted through the mounting block Precise angular adjustment of the dynamo axis 11 is facilitated here by two ball cups 24 flanking a 45° recess in the mounting block. Although this holder only weighs a few grams, it is extremely rigid.

A special fastening plate is used to mount the dynamo on forks or seat stays. The plate has an array of drilled holes to enable it to be mounted by insertion of a threaded bracket fastened with nuts onto different tube diameters of forks or fork sliders on the front wheel or onto a seat stay in the case of a rear-wheel mounting. In its upper section it contains a full-length longitudinal drilled hole in order to accommodate the tube 25. The position of the dynamo is adjusted by selecting the appropriate drilled holes in the plate and tilting the plate appropriately relative to the stay. The end face of the plate opposite the dynamo has two pins and/or notches into which the angled torsion spring can engage, with the dynamo being folded up in one locking position and the dynamo being pressed against the rim in the other.

The dynamo holder 8 is pushed onto a tube 25 containing a torsion bar spring 26 (shown by a broken line) by means of the full-length drilled hole at its lower end. The drilled hole in the housing and the tube form the joint around which the dynamo can be rotated in order to raise it from or press it against the rim 5. The swaged free end 27 of the torsion bar spring can be fixed to the dynamo housing in a torsion-proof connection by means of a grub screw 28. The contact pressure of the dynamo is determined by the spacing in the folded-up position. The drilled hole 7 in the dynamo housing 8 mentioned above can be arranged vertically (as shown) or parallel to the main wheel axis, but should always be slightly offset to the side so that the lateral distance from the rim 5 can be adjusted, i.e. the dynamo can be mounted upside down.

FIGS. 5 and 6 show the tube 25 holding the torsion-bar spring 26 with its swaged end 27. A bracket 30 and nuts 33 secure the fastening plate 31 to a stay 29. The fastening plate 31 has notches 33.

Hermetic sealing is neither meaningful nor necessary for this design because any moisture penetrating can flow down and away at any time and the dissipated heat dries the dynamo thoroughly each time that it is used. Closed housings frequently have problems with condensation trapped inside that may provoke a permanent corrosion process. If the stator pack and winding are soaked in an immersion bath, the inner workings of the dynamo should be sufficiently protected against vibration and corrosion. In the case of automobile alternators, the winding is also partially exposed and can be hit by a steam jet. The magnetic feedback ring and also the magnets themselves also have a corrosion-proof surface coating. Only the upper ball bearing remains a possible weak point. Due to its mounting position at the top of the rotating dome, it is in any case only slightly exposed and in a stainless steel design with a non-contact cover is sufficiently protected. The lower bearing is encapsulated in the housing by a stopper 9. In order to make the dynamo completely resistant, a shaft seal is placed immediately above the upper bearing against the axle. If the dynamo is operated only occasionally, corrosion-proof plain bearings can be used.

Systematic functional separation of electricity generation and power control means that a dynamo specially adapted for operation with LED headlights has its efficiency improved to such an extent that its braking effect, even with perfect Illumination of the road, is below one Newton (corresponds to a gradient of approx. 1:900) and is therefore imperceptible.

The construction design of the dynamo as a multipolar external rotor makes it extremely compact and lightweight (below 60 grams), which also renders it particularly suitable for installation on sports and racing cycles. The low mechanical power consumption enables it to be driven by friction on the rim, which means that it runs especially smoothly and quietly. A cleverly devised fastening system facilitates mounting on practically all common types of bicycle.

The invention claimed is:
1. A bicycle dynamo for a bicycle having a frame and a wheel, the dynamo comprising:
   a stator;
   an internal stationary winding fixed on the stator;
   an external rotor rotatable on the stator and having
      a rotatable cylindrical external casing surrounding the winding and formed with an outwardly open annular groove,
      a plurality of permanent magnets inside the casing that generate an electrical voltage in the internal stationary stator winding, and
      an elastic ring frictionally engageable with a rim of the bicycle wheel, set in the annular groove, and projecting from the outer casing;
   a holder carrying the stator and formed with a plurality of rows of at least four holes;
   a bracket; and
   nuts for securing the bracket to the holes for mounting the stator on different elements of the frame at different angles of inclination.

2. The bicycle dynamo according to claim 1 wherein the stator on one side of the external rotor has a coaxially protruding extension that is fastened to the holder arranged perpendicularly to the axis of the dynamo, with the holder capable of tilting under spring tension about a rotational axis perpendicular to the dynamo axis to press the dynamo with the elastic ring against the rim by a spring.

3. The bicycle dynamo according to claim 2 wherein the holder has a longitudinal drilled hole in which a torsion bar spring is provided as the spring.

4. The bicycle dynamo according to claim 2 wherein one end of the holder is connected to the bicycle with the boss of a rim brake via a ball joint or ball and socket joint.

5. The bicycle dynamo according to claim 1 wherein the holder is formed by a fastening plate carrying the spring and that can be fastened to the bicycle by means of the bracket and nuts.

6. The bicycle dynamo according to claim 1 further comprising:
   a P.C. thermistor in an electrical circuit for the voltage generated by the dynamo, the P.C. thermistor heating up and thus raising its ohmic resistance when the dynamo rotates at high speeds.

7. The bicycle dynamo according to claim 1 wherein, for purposes of weight reduction, the cap of the rotor consists of aluminum and the circumferential annular groove for accommodating the elastic ring is formed by a Y-shaped joint between the aluminum cap and the steel magnetic feedback ring.

8. The bicycle dynamo according to claim 1 wherein the magnets are cemented into a magnetic feedback ring that faces a differing lower number of slots or pole shanks.

* * * * *